United States Patent [19]
Akeyson

[11] 3,929,080
[45] Dec. 30, 1975

[54] CULTIVATING AND PARTICLED MATERIAL APPLYING GARDENING TOOL

[76] Inventor: Swan M. Akeyson, 726 Walnut, Long Beach, Calif. 90813

[22] Filed: Aug. 26, 1974

[21] Appl. No.: 500,290

[52] U.S. Cl. .......................... 111/1; 111/8; 111/10; 222/370
[51] Int. Cl.² .......................................... A01C 7/08
[58] Field of Search ............... 111/10, 11, 1, 92, 95, 111/8, 7.1, 7.2; 222/370, 471–474

[56] References Cited
UNITED STATES PATENTS

| 257,820 | 5/1882 | Horton | 111/95 |
|---|---|---|---|
| 1,282,194 | 10/1918 | Combs | 111/1 X |
| 2,530,886 | 11/1950 | Maisel | 111/8 X |
| 2,600,131 | 6/1952 | Schwarm et al. | 111/1 |
| 2,734,468 | 2/1956 | Jones | 111/92 X |
| 2,824,743 | 2/1958 | Humby | 111/1 X |
| 2,987,018 | 6/1961 | Vath | 111/8 |

*Primary Examiner*—Stephen C. Pellegrino

[57] ABSTRACT

A device in which a single elongate shaft serves to support a tined structure for the cultivation of soil, a hopper for holding a quantity of particled material such as an insecticide or the like that will have a beneficial result when applied to the soil, and manually operated means associated with the handle and hopper for intermittently discharging metered quantities of particled materials onto the ground either concurrently with the cultivation or prior to or after the cultivation.

3 Claims, 3 Drawing Figures

U.S. Patent Dec. 30, 1975 3,929,080
FIG. 1
FIG. 2
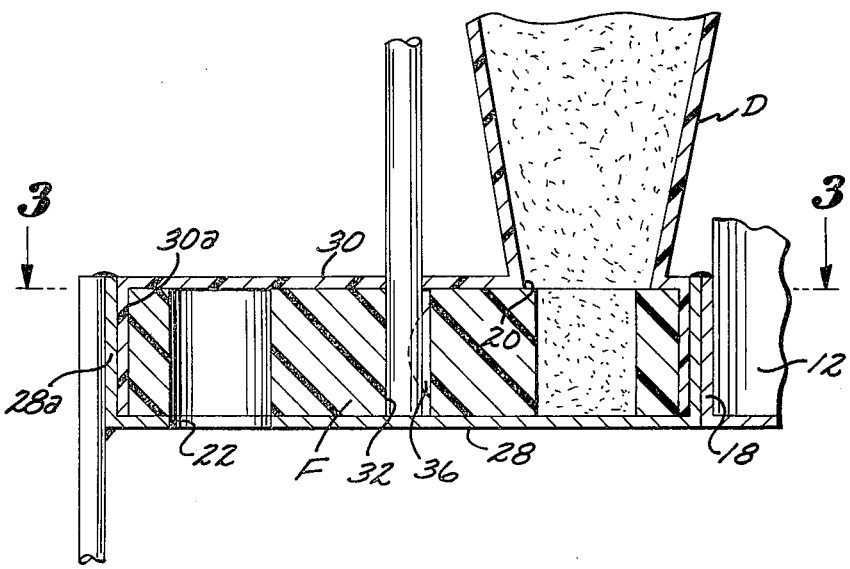
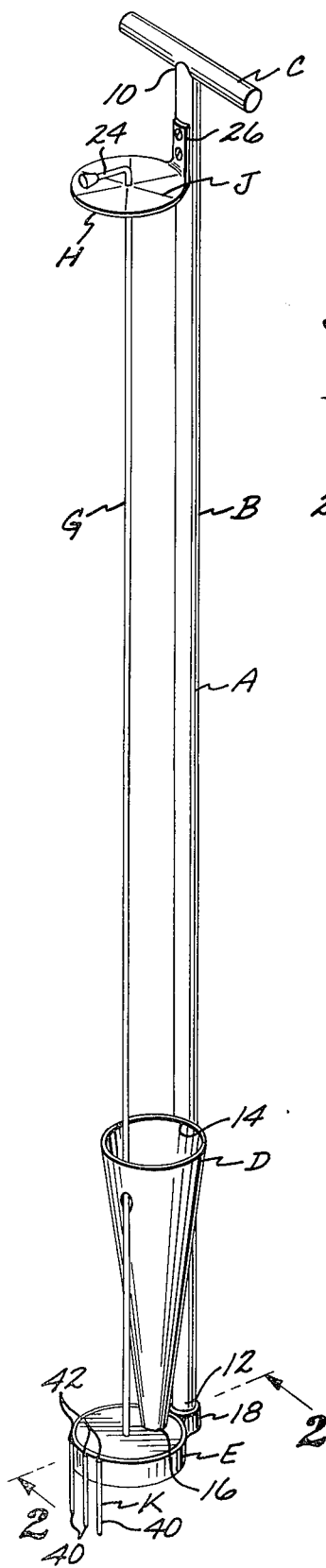
FIG. 3

CULTIVATING AND PARTICLED MATERIAL APPLYING GARDENING TOOL

BACKGROUND OF THE INVENTION

1. Field of the Invention

Cultivating and particled material applying gardening tool.

2. Description of the Prior Art

In the gardening of small areas of land, it is convenient to utilize a single tool that is capable of effecting light cultivation of the ground surface, and also adapted for use in intermittently applying metered quantities of a particled material such as an insecticide or the like thereto.

A major object of the present invention is to supply an inexpensive gardening tool that is compact, light in weight, can be fabricated from stancard commercially available materials, may be used to not only cultivate the ground surface, but to intermittently apply metered quantities of particled material such as an insecticide thereto, and one in which a single shaft is employed to support a tined structure for cultivation of the ground, a hopper for holding a quantity of the particled material, and a manual control to intermittently discharge metered quantities of the particled material onto the ground surface.

SUMMARY OF THE INVENTION

The cultivating and particled material applying gardening tool includes an elongate shaft having first and second ends, with a handle being mounted on the first end and a hopper on the second end. The hopper serves to store a quantity of the particled material that is to be metered onto the ground surface.

The lower end of the hopper is in communication with a housing that has a rotatable metering device within the confines thereof, and the metering device being actuated by a control mechanism that extends longitudinally along the shaft and is rotatable thereto. The housing has a particled material discharge opening on the lower portion thereof.

A plate extends outwardly from the shaft and is substantially normal thereto, and the plates having circumferentially spaced insignia on the upper portion thereof. The control mechanism is so operatively associated with the plates that when a handle on the control mechanism is aligned with one of the insignia, a metering chamber is axially aligned with the discharge opening in the housing, and a metered quantity of the particled material discharges downwardly from the chamber by gravity onto the ground surface. The housing in addition to serving the above mentioned function, also serves as a mounting for a tined structure that permits the ground surface to be cultivated either when the device is being used for dispensing metered quantities of the particled materials or before or after such dispensing operation.

BRIEF DESCRIPTION OF THE DRAWING

FIG. 1 is a perspective view of the cultivating and particled material applying gardening tool;

FIG. 2 is a fragmentary longitudinal cross sectional view of the device shown in FIG. 1 and taken on the line 2—2 thereof; and FIG. 3 is a transverse cross sectional view of the device taken on the line 3—3 of FIG. 2.

DESCRIPTION OF THE PREFERRED EMBODIMENT

The cultivating and particled material applying gardening tool A is shown in perspective in FIG. 1, and includes an elongate shaft B that has a first end 10 and second lower end 12. A handle C is secured to the first end B by conventional means. The invention A includes an elongate hopper D having a first upper open end 14 and a second lower end 16.

The second open end 16 of the hopper D is in communication with the interior of a housing E that has a rotatable metering device F situated within the interior thereof. The housing E has an inlet opening 20 therein as shown in FIG. 2 through which granular material L may flow by gravity into the metering device F from hopper D, and as the metering device F rotates metered quantities of the material are discharged through an opening 22 in the lower portions of the housing E.

A control mechanism G is provided to sequentially and intermittently rotate the metering device F. The control mechanism G has a handle 24 on the upper portions thereof that is situated above a plate H that is normally disposed to the shaft B and supported therefrom by a bracket 26, with the plate H having a number of radially extending, circumferentially spaced, insignias J thereon. The insignia J are so arranged on the plate that when the handle 24 is aligned with one of the insignia the metering device F is oriented to discharge a metered quantity of the granular material L downwardly through the opening 22.

The housing E in addition to serving to meter the particled material L also serves as a support for a tined structure K as shown in FIG. 1, which permits the ground surface to be cultivated either concurrently with discharge of the particled material L from the housing, or before or after such material is dispensed from the ground surface in a metered quantity.

The housing E as may be seen in FIG. 2 is preferably defined by a first cup shaped member 28 having a cylindrical side wall 28a and a second inverted cup shaped member 30 having a cylindrical side wall 30a that snuggly and slidably engages the first cup shaped member 28. The second cup shaped member 30 has a centrally disposed opening 32 defined therein. The hopper D is rigidly secured to the second cup shaped member as shown in FIG. 2, and preferably formed as an integral part thereof. The metering device F as may be seen in FIGS. 2 and 3 is in the form of a circular body 33 that is rotatable within the second cup shaped member 30, with the body 33 having a number of circumferentially spaced metering openings 34 formed therein, and each of these openings being axially alignable with the opening 20 to receive quantities of the particles material L by gravity from the hopper D.

After one of the openings 34 has been filled with a metered quantity of the particled material L, the body 33 is rotated in the direction of the arrow as shown in FIG. 3 to ultimately dispose each opening in axial alignment with the opening 22 to permit the metered quantity of particled material L therein to discharge downwardly through the opening 22 onto the ground surface (not shown). The elongate control member C as shown in FIGS. 1 and 3 extends downwardly through the opening 32 in the second cup shaped member 30 to engage a bore 38 formed in body 32, and be held in a non-rotatable position relative thereto by a key 36. The tine structure K is a number of straight spaced rods 40 that extend downwardly below the housing E and are rigidly secured thereto by welding or the like.

The use and operation of the invention is extremely simple. The hopper D is filled with a quantity of the particled material L, and the handle 24 is then intermittently rotated from one insignia to the next until at least three of the openings 34 have been filled with the particled material L. When the body 32 is rotated to the next insignia by actuation of the handle 24, one of the filled openings is axially aligned with the opening 22, and a metered quantity of the particled material L in the opening discharges downwardly from the housing E onto the ground surface (not shown).

The device is continued to be used in the above described manner, only now as the handle 24 is turned clockwise and aligned with each of the insignia J a metered quantity of the particled material L is discharged from the housing E. During this discharge of metered quantities of the particled material L, which h may be an insecticide or the like, the ground surface (not shown) may be cultivated by bringing the tined structure K into pressure scraping contact therewith. Thus, cultivation of the ground surface (not shown) may be effected concurrently with the discharge of a metered quantity of the particled material L thereon, or the cultivation effected before or after such dispensing of a metered quantity of the material L.

The use and operation of the invention has been explained previously in detail and need not be repeated.

I claim:

1. A soil cultivating and particled material applying device that includes:
   a. an elongate shaft having first and second ends;
   b. tine means projecting from said first end of said shaft;
   c. a hopper secured to said shaft adjacent said first end thereof, said hopper having first and second open ends, said hopper capable of having said particled material positioned therein through said first open end, and said particled material discharging by gravity through said open end;
   d. a cylindrical housing in communication with said second open end, said housing secured in a fixed position relative to said shaft, with said housing having a particled material discharge opening therein adjacent said tine means and said housing including two spaced end pieces;
   e. rotatable metering means in said housing, said metering means when in a first position receiving and holding a metered quantity of said particled material from said hopper through said second end thereof, and said metering means when pivoted to a second position discharging said metered quantity of said particled material by gravity through said discharge opening to fall to the ground surface said rotatable metering means including;
      1. a rod of circular transverse cross section journalled in said end pieces and extending therebetween, said rod having first and second arms extending outwardly from opposite ends thereof; and
      2. at least a portion of a cylindrical shell in said housing rigidly secured to said rod, said shell having a metering chamber therein that receives said granular material from said hopper when aligned with said second end thereof, with said chamber discharging said granular material through said discharge opening when aligned with the latter, and said manually operated means being pivotally connected to said first arm.
   f. spring loaded means that at all times tend to maintain said metering means in said first position; and
   g. first manually operated means for moving said metering means from said first to said second position to permit a metered quantity of said particled material to the ground as the latter is cultivated by said tine means.

2. A device as defined in claim 1 in which said tine means are a plurality of spaced tines that are secured to said housing and project outwardly therefrom away from said shaft.

3. A device as defined in claim 1 which in addition includes:
   k. a second handle secured to said first end of said shaft for holding said device when the latter is being used for cultivating and particled material dispensing purposes.

* * * * *